(12) United States Patent
Paul

(10) Patent No.: US 6,273,446 B1
(45) Date of Patent: Aug. 14, 2001

(54) STEERING CONTROL SYSTEM FOR TRAILERS

(75) Inventor: Eddie Paul, El Segundo, CA (US)

(73) Assignee: Magic Axle Systems Ltd, Auburn, CA (US)

( * ) Notice: Subject to any disclaimer, the term of this patent is extended or adjusted under 35 U.S.C. 154(b) by 0 days.

(21) Appl. No.: 09/437,549

(22) Filed: Nov. 10, 1999

Related U.S. Application Data
(60) Provisional application No. 60/108,177, filed on Nov. 13, 1998.

(51) Int. Cl.$^7$ .................................................. B60D 13/04
(52) U.S. Cl. ..................... 280/448; 280/442; 280/446.1; 280/445
(58) Field of Search ..................... 280/426, 442, 280/443, 444, 445, 448, 446.1

(56) References Cited

U.S. PATENT DOCUMENTS

| | | | | |
|---|---|---|---|---|
| 3,753,580 | * | 8/1973 | Folkert ................................. | 280/443 |
| 3,834,480 | * | 9/1974 | McGee ............................ | 180/79.2 B |
| 4,219,208 | * | 8/1980 | Fuller et al. ......................... | 280/445 |
| 4,345,775 | * | 8/1982 | Merrifield ............................ | 280/443 |
| 4,824,135 | * | 4/1989 | McGregor ........................... | 280/442 |
| 5,244,226 | * | 9/1993 | Bergh ................................. | 280/442 |

FOREIGN PATENT DOCUMENTS

| | | | | |
|---|---|---|---|---|
| 3919561 | * | 12/1990 | (DE) .................................... | 280/442 |
| 1498635 | * | 8/1989 | (SU) .................................... | 280/442 |

* cited by examiner

Primary Examiner—Brian L. Johnson
Assistant Examiner—Daniel Yeagley
(74) Attorney, Agent, or Firm—John E. Vanderburgh

(57) ABSTRACT

A steerable trailer is provided with a trailer hitch which extends forward to attach to a corresponding hitch on the towing vehicle. The towing vehicle hitch further includes an extending arm, referred to as the position arm, to which the end of the piston of a hydraulic master cylinder carried by the trailer is pivotally attached. A slave cylinder carried by the trailer adjacent to the steerable wheels is in hydraulic communication with the master cylinder for turning the steerable wheels. A pair of hydraulic lines communicate between the master cylinder and the slave cylinder to extend or retract the slave cylinder piston rod. The steerable wheels are rotatably and pivotally connected to an axle by conventional steering knuckles. A pivot arm is affixed to the steering knuckle of one of the wheels and to a tie rod extending from the steering knuckle of the opposite wheel. The extending end of the cylinder rod of the slave cylinder carries a steering knuckle to which is pivotally attached the pivot arm. During the towing operation, steering the towing vehicle changes the relative angle between the position arm and the trailer hitch causing of the piston of the master cylinder to compress hydraulic fluid through one or another of the hydraulic lines which in turn activates the slave cylinder to extend or withdraw its cylinder rod. Extension or retraction of the slave cylinder piston rod acts on the pivot arm to turn the steerable wheels to steer the trailer in the same direction as the towing vehicle.

2 Claims, 5 Drawing Sheets

STEERING CONTROL SYSTEM FOR TRAILERS

CROSS REFERENCE TO RELATED APPLICATION

This application claims the benefit of provisional application Ser. No. 60/108,177, filed Nov. 13, 1998 by Eddie Paul entitled STEERING CONTROL SYSTEM FOR TRAILERS. STEERING CONTROL SYSTEM FOR TRAILERS

FIELD OF THE INVENTION

This invention relates to steerable trailers and more particularly to system that controls steering of a trailer.

BACKGROUND OF THE INVENTION

A great difficulty in the operation of articulated vehicles is control of the towed component, particularly while backing. Drivers of large tractor/trailer vehicles develop a high degree of skill in this procedure but only after training and substantial driving experience. However, smaller trailers are widely used by non-professional drivers for diverse purposes, for example, such as towing recreational trailers or small rental trailers and the like. Often these trailers must be backed in to locations which are confined or otherwise limited in size. Many drivers have little or no experience in this procedure and are able to barely maneuvered the trailer during the back up operation. This often can result in property damage and/or an embarrassed driver.

It is an object of this invention to provide a trailer which can be steered while being towed, particularly when being backed.

Another object of the invention is to provide a steering system which can sense the relative position of the towing vehicle to the trailer and to control the steerable wheels of the trailer relative thereto.

Yet another object of the invention is to provide a steering system for a trailer which is inactivated when the trailer is moving in a forward direction to allow for normal forward pulling operation.

SUMMARY OF THE INVENTION

The present invention relates to a steering system for trailers having one or more axles, one axle of which carries steerable wheels. The mechinism operates when the trailer is moving to control the direction of the wheels by sensing the relative position of the towing vehicle to the trailer. In one embodiment of the invention the steering system includes a locking assembly which operates to lock the steerable wheels of the trailer when the trailer is moving forward for towing the trailer in the conventional fashion.

In more detail, the trailer is provided with a trailer hitch which extends forward to attach to a corresponding hitch on the towing vehicle. An extending arm, referred to as the position arm, is secured to the towing vehicle and the end of the piston rod of a hydraulic master cylinder carried by the trailer is pivotally attached to the piston arm. A slave cylinder carried by the trailer adjacent to the steerable wheels is in hydraulic communication with the master cylinder for pivoting the steerable wheels in response to the movement of the master cylinder piston rod. A pair of hydraulic lines communicate between the master cylinder and the slave cylinder to extend or retract the slave cylinder piston rod.

The steerable wheels are rotatably and pivotally connected to an axle by conventional steering knuckles. A pivot arm is affixed to the steering knuckle of one of the wheels and to a tie rod extending from the steering knuckle of the opposite wheel. The extending end of the piston rod of the slave cylinder is connected to one of the steering knuckles. During the towing operation, steering the towing vehicle changes the relative angle between the position arm and the trailer hitch causing of the piston rod of the master cylinder to extend or retract to compress hydraulic fluid through one or another of the hydraulic lines which in turn activates the slave cylinder to extend or withdraw its piston rod. Extension or retraction of the slave cylinder piston rod acts on the pivot arm to turn the steerable wheels to steer the trailer in the essentially the same track as the towing vehicle.

In one embodiment of the invention a clutch and lock system locks the steerable wheels of the trailer in a direction parallel to the center axis of the trailer so they cannot be steered while the trailer moves forward. A valve in both hydraulic lines is positioned to recycle hydraulic fluid to the master cylinder so that activation of the master cylinder during normal forward towing is not communicated to the pivot arm. Upon reversing the direction of rotation of the steerable wheels, the clutch and lock system releases to activate the steering system.

DESCRIPTION OF THE PREFERRED EMBODIMENT

Figure 1:
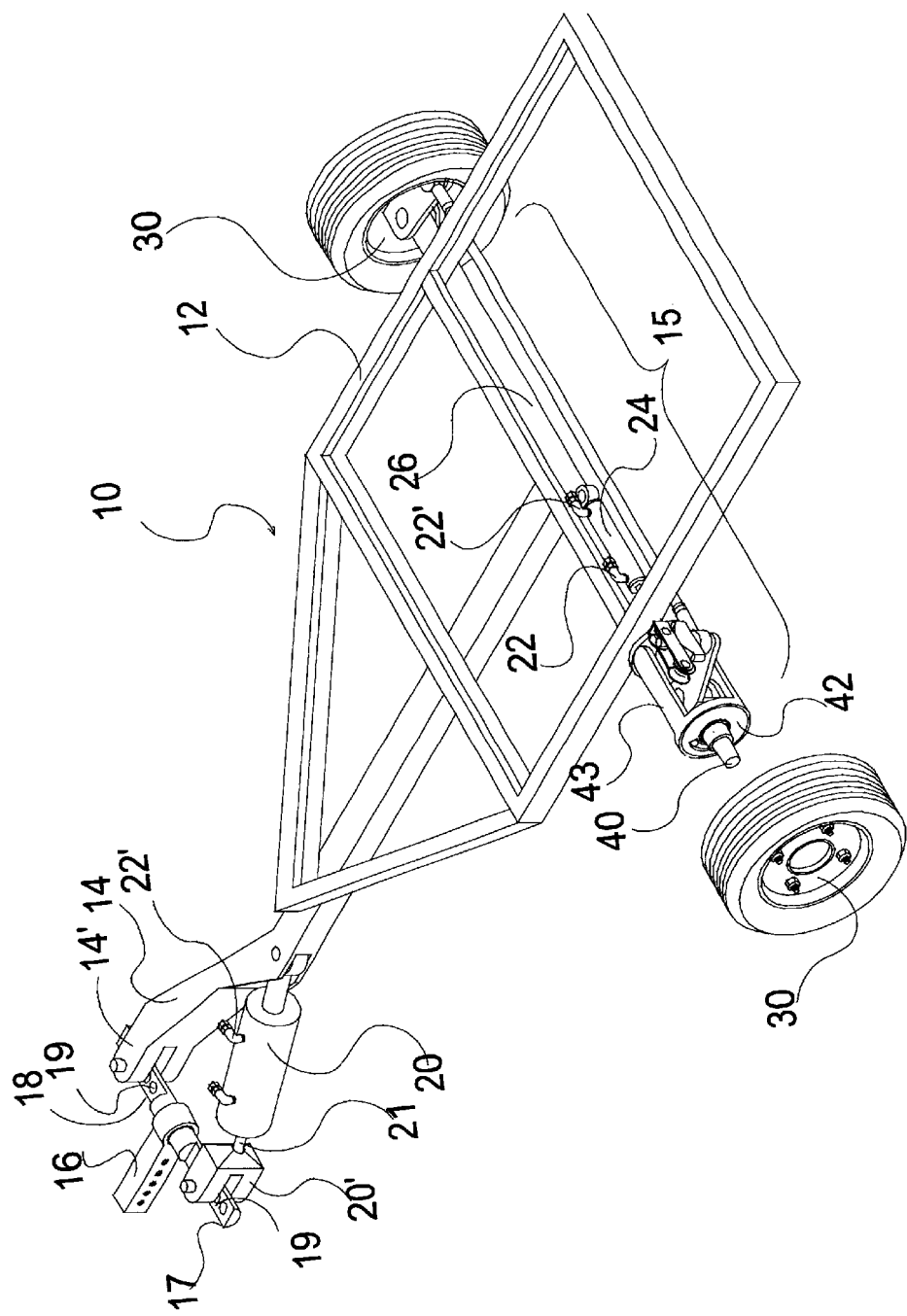
FIG. 1 is a perspective view of a trailer incorporating the steering control system of the present invention including a locking mechanism for disabling the system when the trailer is moving forward.

Referring to FIG. 1, there is illustrated a trailer 10 comprising a frame 12, a forwardly extending trailer hitch 14 and a steerable wheel assembly 15. The towing vehicle is provided with a corresponding T-shaped towing assembly consisting of a towbar 16 and a cross bar which defines a position arm 17 and a towing arm 18. A series of adjustment holes 19 are provided in each of the arms 17 and 18. The trailer hitch 14 is pivotally attached to the towing arm 18 by means of a pin extending through a clevis 14' formed at the end of the trailer hitch. A double acting hydraulic master cylinder 20 is pivotally connected to the trailer hitch 14 at one end and to the position arm 17 by means of a clevis 20' formed on the end of the piston rod 21 of the master cylinder. The side of the cross bar defining the position arm 17 and the towing arm 18 is not critical and will depend on the design of the trailer hitch 14. A pair of hydraulic fluid lines 22 and 22' extend from the master cylinder 20 to a double acting slave cylinder 24 mounted on the steerable wheel assembly 15 for operation of the steerable wheel assembly as described below.

Figure 2:
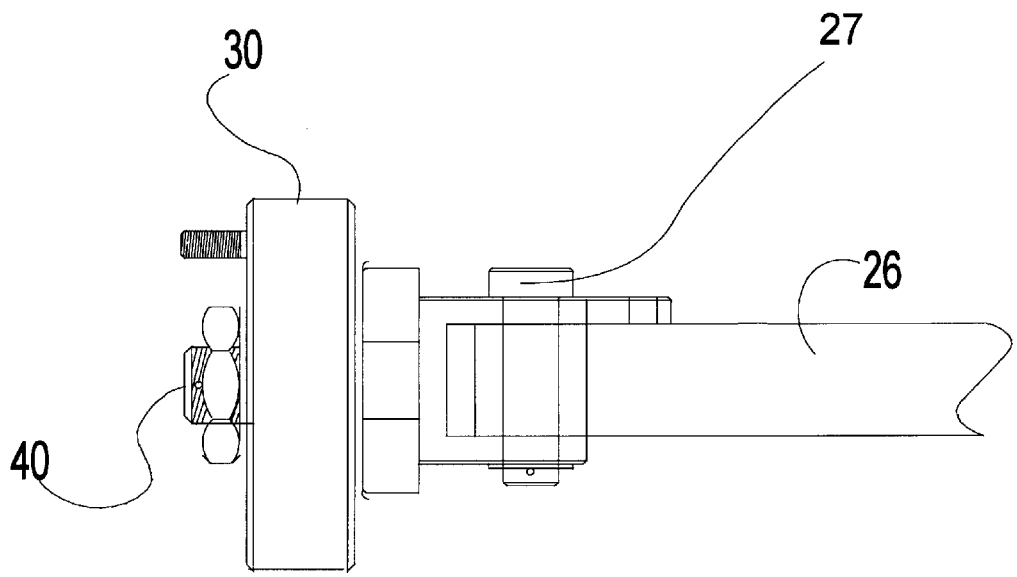
FIG. 2; is a side view of the wheel hub assembly of an embodiment of the invention without the locking mechanism.
Figure 3:
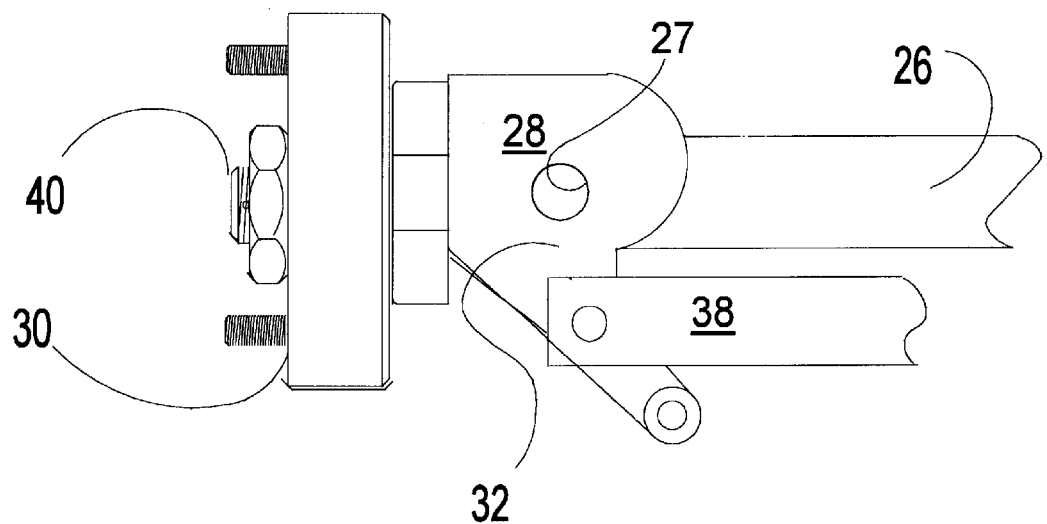
FIG. 3 is a top view of the wheel hub assembly of FIG. 2.

Referring to FIG. 2 and FIG. 3, the steerable wheel assembly 15 includes an axle 26 on each end of which is pivotally mounted a steering knuckle 28 and 28'. A pin 27 secures the steering knuckle 28 axle 26. A wheel hub 30 is threadably mounted in each of the steering knuckles 28 for pivotal movement responsive to the pivoting of the steering knuckle. A pivot arm 32 is formed on the steering knuckles 24 and 24' and A tie rod 38 links the pivot arms together so that the steering knuckles 28 and 28' pivot uniformly and simultaneously. The free end of the piston rod of the slave cylinder 24 is also connected to to the pivot arm 32 of the steering knuckle 28.

Figures 7A, 7B:
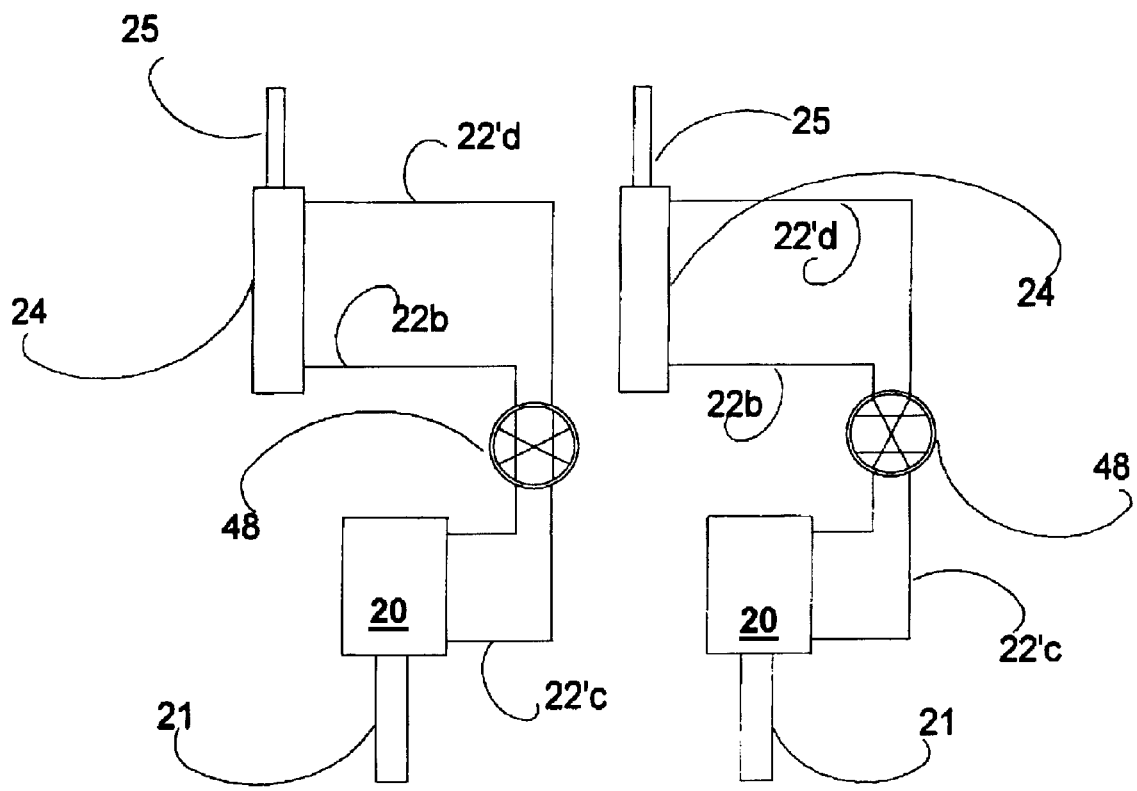
FIG. 7A and FIG. 7B are schematic flow diagrams illustrating the hydraulic flow of the steering control system of the present invention as the trailer is towed in a forward and a reverse direction.

FIG. 7A and FIG. 7B are schematic flow diagrams of the hydraulic system of the steering system 15. Hydraulic lines 22a and b and 22'c and d communicate between the master cylinder 20 and the slave cylinder 24 through a four way valve 48 of conventional design which is activated by a solenoid (not shown) to a first position when the trailer is moving in reverse (FIG. 7A) and a second position when the trailer is moving forward (FIG. 7B). In FIG. 7A, representing the flow diagram for reverse steering, the valve is positioned so that line 22a from the master cylinder 20 communicates with line 22b to the slave cylinder and similarly line 22'c communicates with line 22'd. Thus moving piston rod 21 upwardly on the drawing creates pressure in line 22a which is transmitted to line 22b causing the piston rod 25 to extend. Likewise, moving the piston rod 21 downward on the drawing creates pressure in line 22'c which is transmitted to line 22'd to cause the piston rod 25 to contract. Repositioning valve 48, as shown in FIG. 7B for steering the trailer while moving forward, reverses the operation of the hydraulic cylinders 20 and 24 by causing the line 22a to communicate with the line 22'd and the line 22'c to communicate with the line 22b. Thus contraction of the piston rod 21 results in contraction of the piston rod 25.

As mentioned above, the valve 48 is solenoid operated in a conventional fashion and the solenoid is electrically connected to the circuit for the backup lights so that the valve position is changed when the towing vehicle is put in reverse. As is conventional the solenoid is spring loaded so that the valve returns to its starting position for forward towing when the towing vehicle is taken out of reverse.

In operation the trailer hitch 14 is attached to one side of the position arm 17 by the hitch clevis 14' and a pin which extends through one of the holes 19 in the position arm to retain the clevis in place. The master cylinder piston rod 21 is attached at the other end of the position arm 17 by means of the clevis 20'. Once the trailer 10 is hitched to its towing vehicle, no other mechanical or hydraulic connections are required except for standard electrical connections for running lights and brake lights as is required for legal operation on public roads. In a straight forward motion, the angle between the position arm and the hitch is normally about 45 degrees. Turning the towing vehicle will increase or decrease this angle causing the piston of the hydraulic master cylinder 20 to pressurize hydraulic fluid through one or the other of the pressurized fluid lines 22 or 22' depending on the orientation of the position arm 17 which acts as a lever to extend or retract the piston rod 21 of the master cylinder. When being towed in the forward direction valve 48 is positioned to to provide fluid communication between section 22a of line 22 and 22'd of line 22' and section 22'c of line 22' and section 22b of line 22. Hydraulic pressure is transmitted through either of lines 22 or 22' to the double action slave cylinder 24. causing its piston to move within the cylinder exerting force on the pivot arm 32 through the end of the piston rod 25. This force is transmitted directly to one of the wheel hubs 30 to which the piston rod 25 is connected and to the opposite wheel hub through the tie rod 38 and pivot arm 32 to provide the steering action to the trailer 10. When towing the trailer 10 in reverse the valve 48 is repositioned by a solenoid actuated by the backup light circuit to allow for fluid communication between sections 22a and 22b of line 22 and sections 22'c and 22'd of line 22'. With the valve 48 in this position the slave cylinder 24 action is opposite to that when the valve 48 is positioned for forward movement of the trailer 10.

In embodiment of the invention illustrated in FIGS. 2 and 3 the steerable wheel assembly 15 is operable when the trailer 10 is being towed in the forward or reverse direction. However, it may be desired to tow the trailer 10 conventionally in the forward direction with the steerable wheels locked and provide the steering function only in the reverse direction. Thus in another embodiment of the invention a locking mechanism is provided to disable the steering features and lock the wheels of the trailer 10 for conventional towing in the forward direction. In this embodiment moving the trailer 10 in the reverse direction mechanically unlocks the steerable wheels allowing the trailer to steer.

Figure 4:
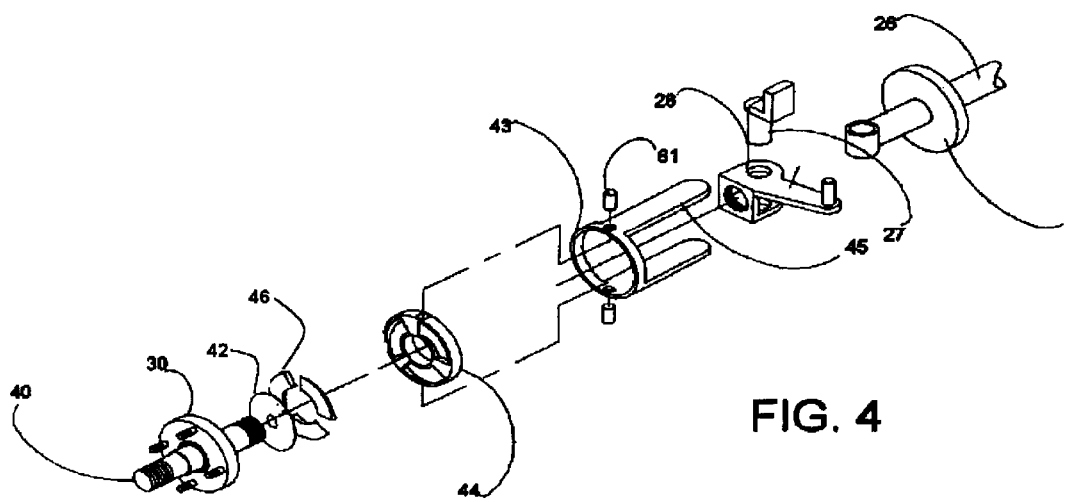
FIG. 4 is a perspective exploded view of one embodiment of the locking mechanism to deactivate the steering control system when the trailer is being towed in a forward direction.
Figures 5, 6:
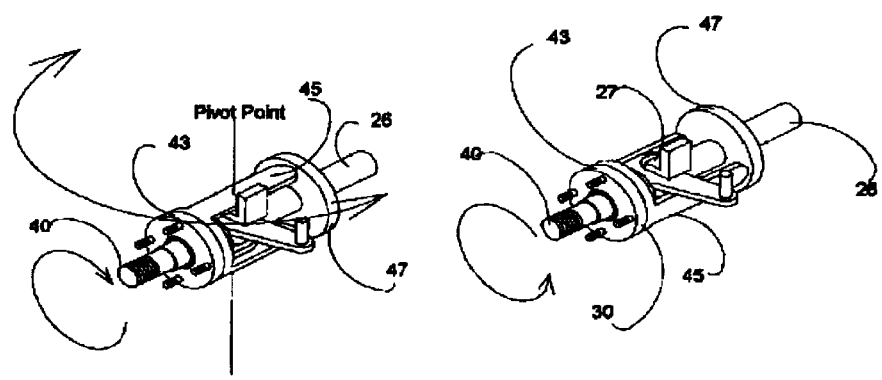
FIG. 5 is a perspective view of the locking mechanism of FIG. 4 in the unlocked position.
FIG. 6 is a perspective view of the steering system of FIG. 4 in the locked position disabling the steering control system.

As is most clearly illustrated in FIG. 4, The locking mechanism is in of the unlocked, operable mode. The wheel hub 30 includes a spindle 40 which is threaded on each end. A rotatable locking ring 43 is disposed about the axle 26 and is provided with extending arms 45. A stop plate 47 is carried on the axle 26 adjacent the terminus of the arms 45. When the extending arms 45 are aligned in a vertical plane, as shown in FIG. 4, the steering knuckle 28 can be pivoted by the piston rod of the slave cylinder 24. A friction clutch assembly comprising a wedge plate 44 is concentrically affixed in the locking ring 43 by pins 61 for rotation therewith. The surface of the wedge plate 44 facing the wheel hub 30 is provided with three locking ramps 49. Wedge shaped radial pads 46 are disposed on each of the locking ramps 49. In the operating mode there is a slight clearance between the wheel hub 30 and the wedge plate 44 and the wheel hub rotates independently of the locking ring 43. As the wheel hub 30 is rotated in the counter clockwise or forward direction the radial pads 46 are moved along the locking ramp to bring the pads 46 into frictional contact with the wheel hub 30 so that the wedge plate and the locking ring 43 rotate with the wheel hub disk. The locking ring arms 45 are rotated into a horizontally aligned position with the ends of the arms stopped by the stop plate 47 to prevent movement of the pivot arm 32. This locks the wheel hubs 30 parallel to the axis of the trailer 10 for forward movement and prevents steering when the wheel hubs are rotating in a forward direction. Reversing the direction of rotation of the wheel hubs 30 rotates the hub, the disc 42 and the locking ring 43 moving the locking arms 45 into a vertically aligned position. In this position the steering knuckle 28 is free to pivot the wheel hubs 30 in response to movement of the piston arm of the slave cylinder 24. The wheel hub 30 is released from the wedge plate 44 allowing the wheel hub 30 to rotate while the locking ring 43 and wedge plate are idle.

Figure 8A:
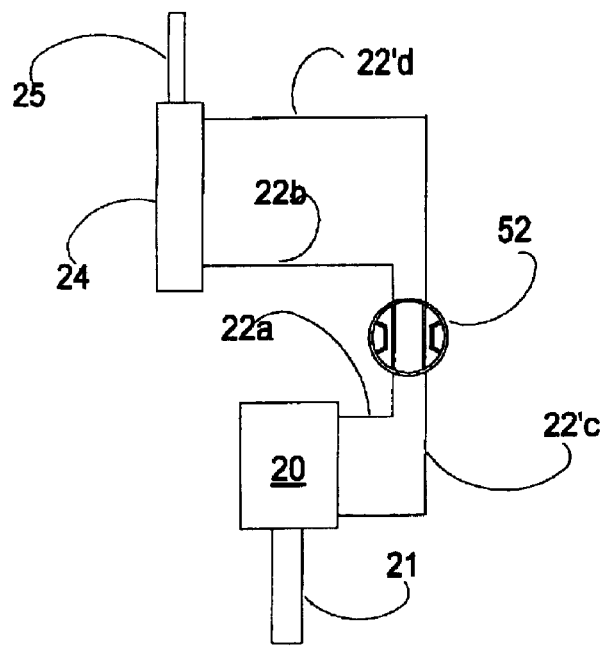
FIG. 8A and FIG. 8B are schematic flow diagrams illustrating the hydraulic flow of the steering control system of the present invention adapted for use with the locking mechanism to disable the steering system when the trailer is being towed in a forward direction.
Figure 8B:
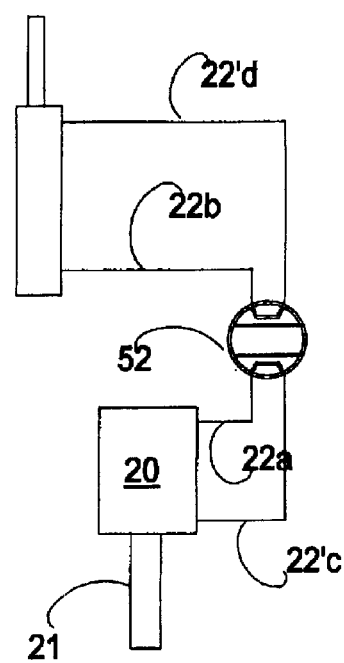

Referring to FIG. 8A and 8B, a valve 52 is provided in the lines 22 and 22' to allow fluid communication (FIG. 8A) through the lines when the steering system 15 is operable as described above. The valve 52 is repositioned (FIG. 8B) so that hydraulic pressure is recycled to the master cylinder rather than to the slave cylinder when the steering system is disabled for conventional forward towing.

Having described the invention, I claim:

1. A steering system for trailers having an axle carrying a steering knuckle at each end and a tie rod extending between said steering knuckle's for pivoting steerable wheels rotatably and pivotally mounted thereon, said system being operable to pivot said steerable wheels to control a turning direction of said trailer responsive to a turning direction of a towing vehicle, said system comprising:

a. a position arm attached to said towing vehicle to indicate the orientation thereof;
   b. a hydraulic master cylinder including a piston having a free end for connection to said position arm;
   c. a hydraulic slave cylinder including a piston arm for attachment to one of said steering knuckle's on said axle of said trailer;
   d. a pair of hydraulic lines for fluid communication between said master cylinder and said slave cylinder;
   e. a valve in fluid communication with both of said hydraulic lines for controlling fluid pressure flow between said master cylinder and said slave cylinder, said valve having a first position for directing fluid pressure flow as said trailer is towed in the forward direction and a second position as said trailer is moved in reverse;
   f. a locking mechanism comprising a rotatable locking ring disposed about said axle carrying said steering knuckle to which said slave cylinder piston arm is attached, said locking ring having a pair of extending arms, said arms being oriented with respect to one another between a vertical plane and a horizontal plane responsive to the rotation of said ring, a stop plate carried on said axle adjacent the terminus of said extending arms to act against said arms and serve as a stop to prevent pivoting of wheel hubs when said extending arms are aligned in a horizontal plane, said wheels being free to pivot when said extending arms are aligned in a vertical plane, a friction clutch assembly comprising a wedge plate concentrically affixed in said locking ring for rotation therewith, a surface of said wedge plate facing said wheel being provided with at least one locking ramp, a wedge shaped radial pad disposed on said locking ramp, said wheel hubs rotating independently of said locking ring when said wheel hubs are rotating in a reverse direction and said extending arms are aligned in a vertical plane, said wedge shaped radial pad being forced along said locking ramp into fictional contact with said wheel hub to rotate said locking ring responsive to the rotation of said wheel hubs thereby to move said extending arms into alignment in a horizontal plane when said wheel hubs rotate in the forward direction.

2. The steering system of claim 1 wherein said valve is in a first position to recycle hydraulic fluid back to said master cylinder to interrupt fluid communication with said slave cylinder when said locking mechanism is in the locked mode as said trailer is moved forward and in a second position to allow fluid communication between said master cylinder and said slave cylinder when said locking mechanism is in the unlocked mode and said trailer is moved in reverse.

* * * * *